US008978894B1

(12) United States Patent
Woiler et al.

(10) Patent No.: US 8,978,894 B1
(45) Date of Patent: Mar. 17, 2015

(54) CLAMP

(71) Applicants: Christopher A. Woiler, College Place, WA (US); Dean D. Dunham, Walla Walla, WA (US); Michael Jones, Walla Walla, WA (US); Michael J. Opp, College Place, WA (US); James D. Ruff, Walla Walla, WA (US)

(72) Inventors: Christopher A. Woiler, College Place, WA (US); Dean D. Dunham, Walla Walla, WA (US); Michael Jones, Walla Walla, WA (US); Michael J. Opp, College Place, WA (US); James D. Ruff, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 14/021,732

(22) Filed: Sep. 9, 2013

(51) Int. Cl.
*B07B 1/49* (2006.01)
*B25B 5/12* (2006.01)
*F16B 2/10* (2006.01)

(52) U.S. Cl.
CPC .................................... *F16B 2/10* (2013.01)
USPC ........ 209/403; 209/405; 198/752.1; 198/771; 269/91; 269/201; 269/228

(58) Field of Classification Search
USPC ............... 209/399, 403, 405; 198/751.1, 759, 198/760, 771; 269/91, 201, 228
See application file for complete search history.

(56) References Cited

U.S. PATENT DOCUMENTS

| | | | | |
|---|---|---|---|---|
| 2,600,584 | A | 4/1947 | Snell | |
| 3,092,573 | A * | 6/1963 | Lambert et al. | 209/403 |
| 3,583,553 | A * | 6/1971 | Spurlin et al. | 198/763 |
| 5,037,536 | A * | 8/1991 | Koch et al. | 209/325 |
| 5,230,163 | A * | 7/1993 | Lease | 34/588 |
| 5,647,102 | A * | 7/1997 | Sterling, Jr. | 24/494 |
| 6,116,588 | A | 9/2000 | Yamane | |
| 6,179,128 | B1 * | 1/2001 | Seyffert | 209/405 |
| 6,283,303 | B1 * | 9/2001 | Lane et al. | 209/405 |
| 6,588,363 | B1 * | 7/2003 | Burke et al. | 118/13 |
| 6,708,587 | B1 | 3/2004 | Noniewicz et al. | |
| 7,216,768 | B2 * | 5/2007 | Fisher et al. | 209/395 |
| 7,621,515 | B2 | 11/2009 | Jurcinsky et al. | |
| 7,648,131 | B2 | 1/2010 | Hagan et al. | |
| 7,878,492 | B2 | 2/2011 | Dykstra | |
| 8,196,272 | B2 * | 6/2012 | Curtis | 24/513 |
| 8,613,433 | B2 | 12/2013 | Poole et al. | |
| 8,733,540 | B2 * | 5/2014 | Woiler et al. | 198/766 |
| 8,827,080 | B2 * | 9/2014 | Holton | 209/395 |

FOREIGN PATENT DOCUMENTS

| | | | |
|---|---|---|---|
| CA | 2274326 | A1 | 11/2000 |
| WO | WO9821514 | | 5/1998 |

OTHER PUBLICATIONS

PCT Search Report dated Jan. 16, 2014.
Search Report dated Nov. 18, 2014.

* cited by examiner

*Primary Examiner* — Douglas Hess
(74) *Attorney, Agent, or Firm* — Paine Hamblen, LLP

(57) ABSTRACT

A clamp is described and which includes a base portion, a handle which is affixed to the base portion, a moveable clamp portion which is individually pivotally attached to the base portion; a pair of force transmitting couplings pivotally attached to the handle, and the movable clamp portion; and an elongated resilient biasing member with a distal end, and which is mounted on the movable clamp portion, and which is further operable to engage an adjacent object of interest and hold it in a given orientation relative to a vibratory conveyor.

23 Claims, 10 Drawing Sheets

CLAMP

TECHNICAL FIELD

The present invention relates to a clamp, and more specifically to a clamp that has usefulness in securing an object of interest on a vibratory conveyor.

BACKGROUND OF THE INVENTION

The prior art is replete with numerous examples of various clamping arrangements which are useful to forcibly engage an object of interest during a manufacturing process, so as to retain the object of interest in a desirable location during a processing step. Examples of prior art clamps useful for holding or otherwise securing objects of interest are seen in U.S. Pat. Nos. 6,595,507 and 7,648,131, the teachings of which are incorporated by reference herein. While clamps of the type described in the previous prior art patents operate with varying degrees of success, such clamps are typically employed in an arrangement whereby the clamp itself is not subjected to significant amounts of vibration while it is in use.

For example, and in connection with the use of various vibratory conveyors, various objects of interest such as sorting screens, foraminous containers, and other objects of interest need to be periodically, and appropriately positioned in a given, secured location along the conveyor bed of a vibratory conveyor so as to process a stream of products in an appropriate manner. Such objects of interest have typically included screens which have been produced in a wide variety of styles, and which have been employed to align, singulate, dewater, length-grade, width-grade, scalp, or even move a given product up an incline. Screens may also be used for several of these functions in a single operation. These screens have come in various customized and/or other standard sizes. The screens may include wire mesh screens, punch plate screens or round or triangular rod screens. The functions of the respective screens, as described, above, such as dewatering, is used to separate a given product from a stream of water after the product has been transported by the water from a pumping or flume system, or are further used for the removal of small amounts of processed water (final dewatering) prior to a final series of processing steps. Additionally, product sizing screens are employed to do length grading, width grading, and scalping of various produce. Still further, other screens are used to remove debris, and smaller unsuitable products such as fines, and which may be mixed with a produce stream being processed. Alignment screens have also been used, heretofore, to align, and singulate products for a downstream process. Finally, converging and diverging screens are employed to take a stream of produce and direct it into either narrow or wider width equipment.

It should be understood, that clamps of various designs are often employed with objects of interest, such as screens and the like, so as to allow the quick removal of these objects of interest for cleaning, repair, and/or replacement as necessary. However, the prior art clamps which have been utilized, heretofore, and other arrangements which have been employed to temporarily secure such objects of interest on a vibratory conveyor, for example, have not achieved the desired success because the clamp arrangements often provide a less than satisfactory securing force such that the objects of interest often are not retained in an appropriate fixed, position, or on the other hand, personnel employing such clamps have used them in an improper way. Still further, and from time-to-time, screens or other objects of interest may be moved between adjacent machines, and such screens may have varying length dimensions which cause difficulty when appropriately positioning them, and then securing them in a given location on a different machine. Additionally, and when the aforementioned prior art clamps are released from an object of interest, the vibratory energy of the associated vibratory conveyor often imparts adverse motion to the clamp. This motion may occasionally cause damage to the clamp, injury to an employee, or interfere with the operation of the associated vibratory conveyor on which it is deployed.

A clamp which can be utilized to firmly secure an object of interest, and be further utilized in an environment where the clamp is repeatedly exposed to continuous vibratory motion is the subject matter of the present application.

SUMMARY OF THE INVENTION

A first aspect of the present invention relates to a clamp, and which includes a base portion having individual support members which are located in predetermined, spaced, substantially parallel relation, one relative to the other; a handle which has opposite ends, and which are individually, pivotally affixed to each of the support members; a moveable clamp portion having opposite ends, and which are individually pivotally attached to the respective support members; a pair of force transmitting couplings each having a first end which is pivotally attached to the handle, and an opposite, second end which is pivotally attached to the moveable clamp portion; and an elongated resilient biasing member having a proximal and a distal end, and which is borne by the moveable clamp portion, and wherein the distal end of the elongated resilient biasing member resiliently deforms when the elongated, resilient biasing member forcibly engages an adjacent object as force is applied to move the handle along a course of travel.

Still another aspect of the present invention relates to a clamp, and which includes a base portion which is affixed to a wall of a vibratory conveyor having a product transporting bed upon which a source of a product is transported, and wherein the base portion has individual support members which are affixed to the wall of the vibratory conveyor, and which further extend perpendicularly, outwardly therefrom, and wherein the individual support members are located a given distance apart; a handle having opposite ends, and a given length dimension which is greater than the length dimension as measured between the respective support members, and wherein the handle further has individual arm members which are mounted on the opposite ends of the of the handle, and which further each have a distal end which is pivotally mounted to one of the support members of the base portion, and which further renders the handle moveable along an arcuately shaped path of travel between a first and a second position; a rotatable clamping portion which is borne by the respective support members, and wherein the rotatable clamping portion has a main body with opposite ends, and wherein each end of the rotatable clamping portion is rotatably mounted on each of the respective support members, and wherein forcible movement of the handle along the path of travel has the effect of causing the selective rotation of the rotatable clamping portion; a pair of force transmitting couplings each having a first end which are individually, rotatably affixed on the handle, and an opposite second end, which is rotatably mounted on the rotatable clamping portion; and a pair of elongated resilient biasing members which are individually mounted on the opposite ends of the rotatable clamping portion, and wherein each of the elongated resilient biasing members has a main body which has a similar length dimension, and wherein a threadably adjustable engagement post is mounted on each of the of the elongated resilient biasing members, and which further causes the elongated resilient biasing members to deform when the respective elongated resilient biasing members forcibly engage an object which cooperates with the vibratory conveyor, and wherein the handle when located in the second clamping position securely positions the object in a given orientation on the vibratory conveyor.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
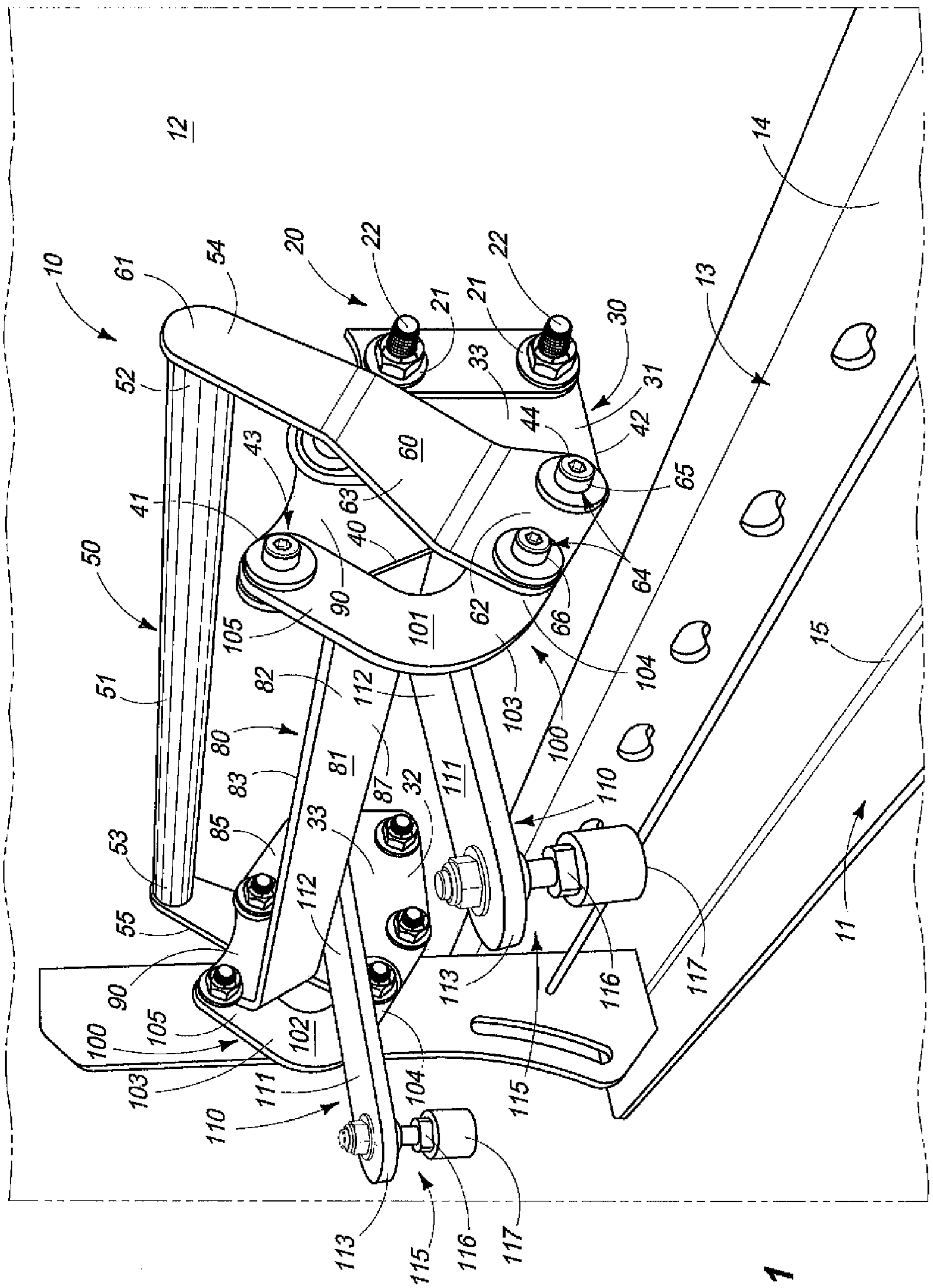
FIG. 1 shows a greatly simplified, fragmentary, perspective view of a prior art vibratory conveyor having an object of interest positioned thereon, and which employs the clamp of the present invention.
Figure 2:
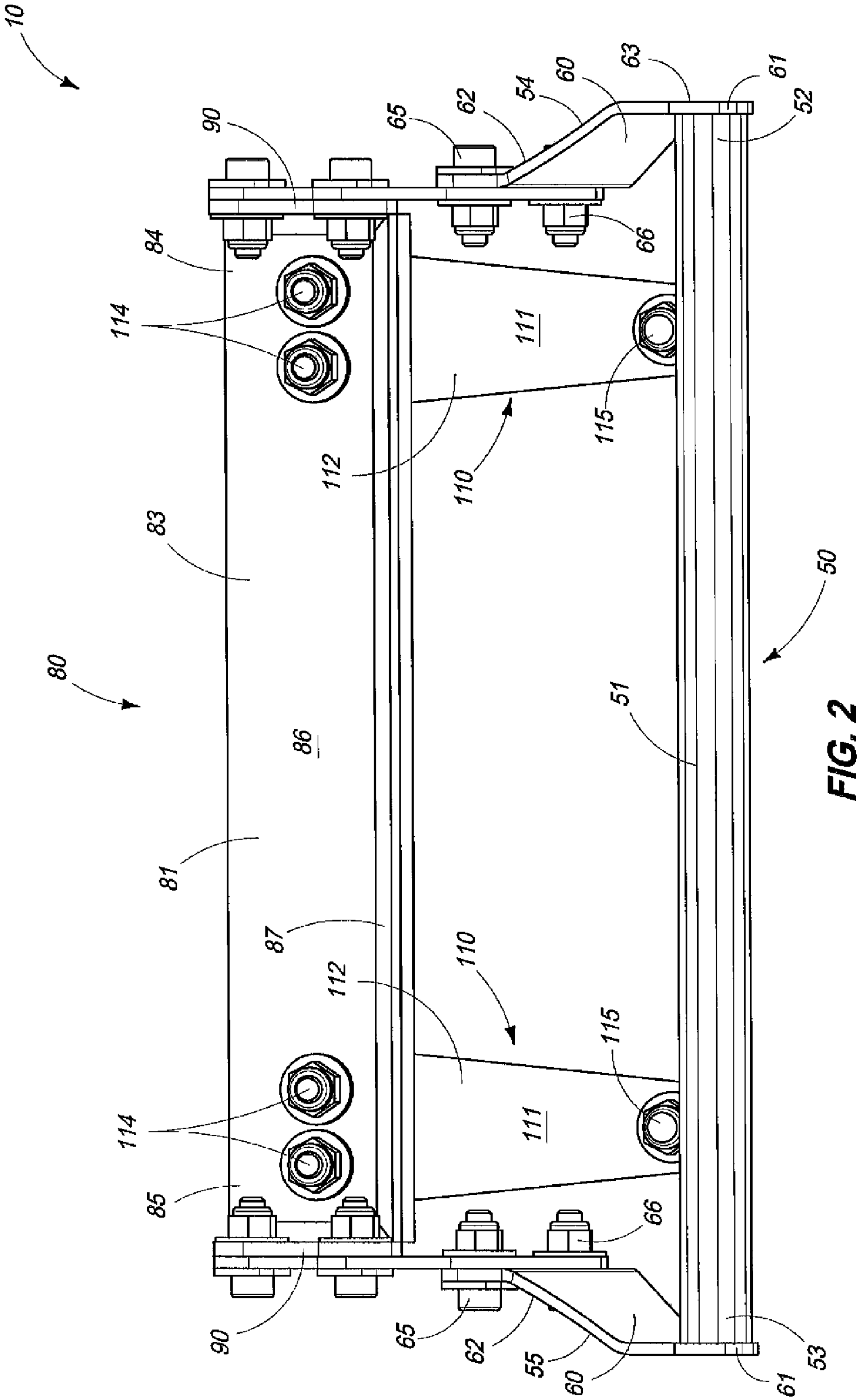
FIG. 2 is a partial, perspective, side elevation view of the clamp of the present invention and which is shown in a closed, clamping position.
Figure 3:
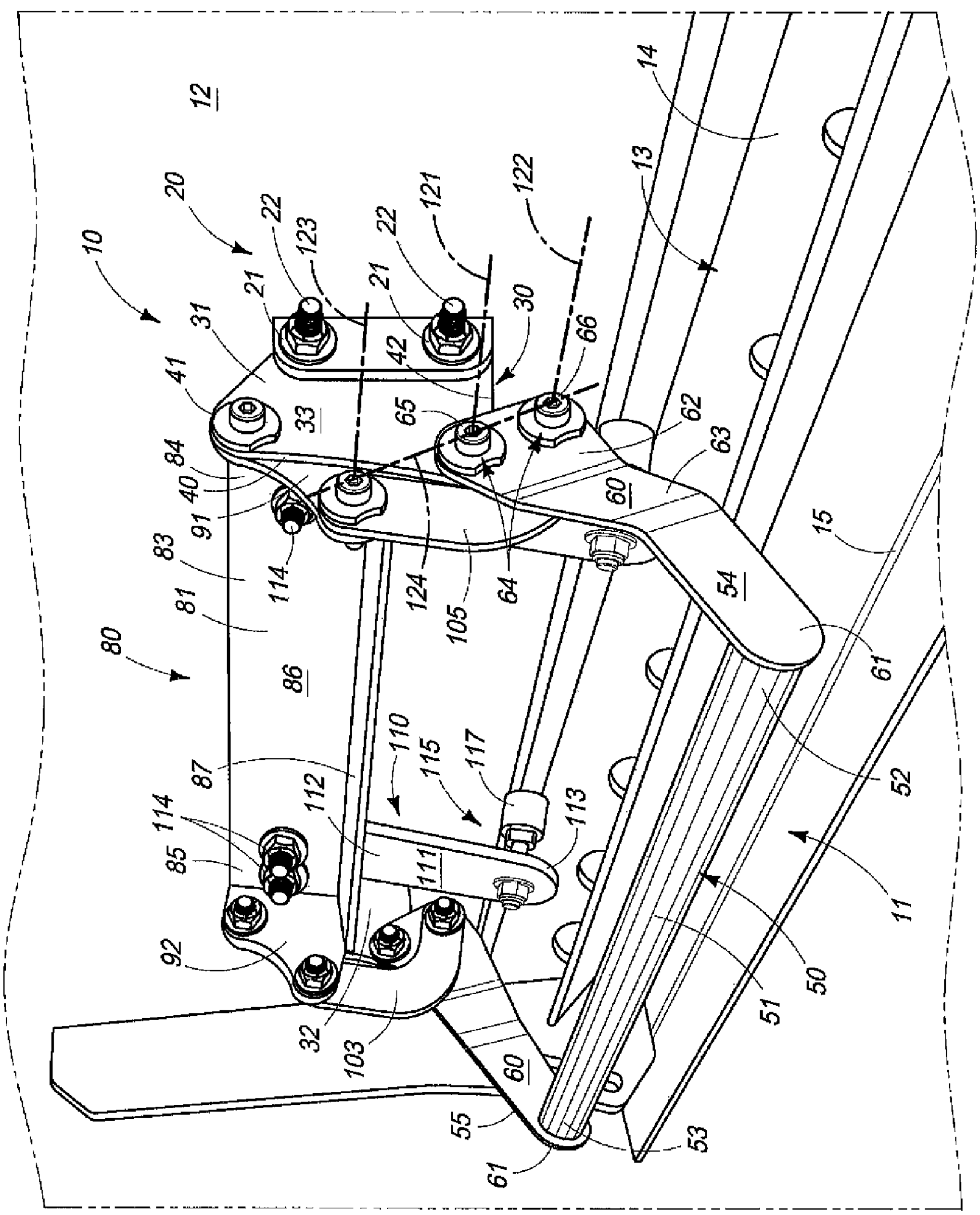
FIG. 3 is a fragmentary, partial, perspective, side elevation view of the present clamp shown in a closed, clamping position.

The present invention is directed to a clamp which is generally indicated by the numeral 10 in FIG. 1, and following. In this regard, the invention 10 is illustrated, herein, as deployed and utilized to releasably engage a vibratory conveyor 11 of conventional design. The vibratory conveyor 11 is defined, at least in part, by a wall 12. Still further, an object of interest for processing a product (not shown), and which is generally indicated by the numeral 13, is partially illustrated, and which is supported in a given orientation relative to the vibratory conveyor 11. The object of interest 13 may include variously sized screens; scalpers; singulators; spreaders; and other food processing devices. The object of interest is shown, in part, by a wall 14 (see FIGS. 10-14 respectively). The object of interest 13 is supported on a product transporting bed 15 which reciprocates along a given axis. The vibratory conveyor is an excited frame type which is well known in the art. Various forms of the object of interest 13 will be discussed later in this application.

With regard to the object of interest 13, which is utilized for processing a product stream, and as earlier discussed, this object of interest could be involved in such things as dewatering a product stream, that is, separating a given product from a water stream after being transported to the vibratory conveyor; performing length grading; width grading or scalping; removing debris such as fines so that only good product remains; aligning food product or singulating food product for downstream processes, and/or converging or diverging a stream of product so that it may be provided to narrower or wider width downstream processing equipment. Other functions, of course, are possible.

As best illustrated in FIG. 1, and following, a pair of support brackets which are generally indicated by the numeral 20, are affixed as by welding, or other similar fastening methods to the wall 12 of the vibratory conveyor 11. As will be appreciated from the later discussion in this specification, the present invention 10 could be affixed to the wall 14 of the object of interest 13 and thereby rendered operable to engage the vibratory conveyor 11. However, as depicted, the support brackets 20 are affixed, as by welding or the like, to the wall 12 of the vibratory conveyor 11. The individual support brackets are located at a given distance apart so as to matingly cooperate with a base portion of the clamp 10, as will be discussed in greater detail in the paragraphs which follow. As seen in FIG. 1, for example, it will be appreciated that the respective support brackets 20 have formed therein a pair of apertures 21. The individual apertures receive fasteners 22 that are operable to releasably secure the clamp 10 of the present invention onto the wall 12 of the vibratory conveyor 11. The respective support brackets 20 locate the clamp 10 at a predetermined location and angular orientation on the wall 12.

The clamp 10 of the present invention further includes a base portion 30 having individual support members which are located in predetermined, spaced, substantially parallel relation one relative to the other. In this regard, the base portion 30 is defined by first and second support members 31 and 32, respectively. The respective first and second support members have a main body 33 which is defined by an inward, or rearwardly facing peripheral edge 34. The depicted rearwardly facing edge 34 has an angle which orients the clamp

Figure 4:
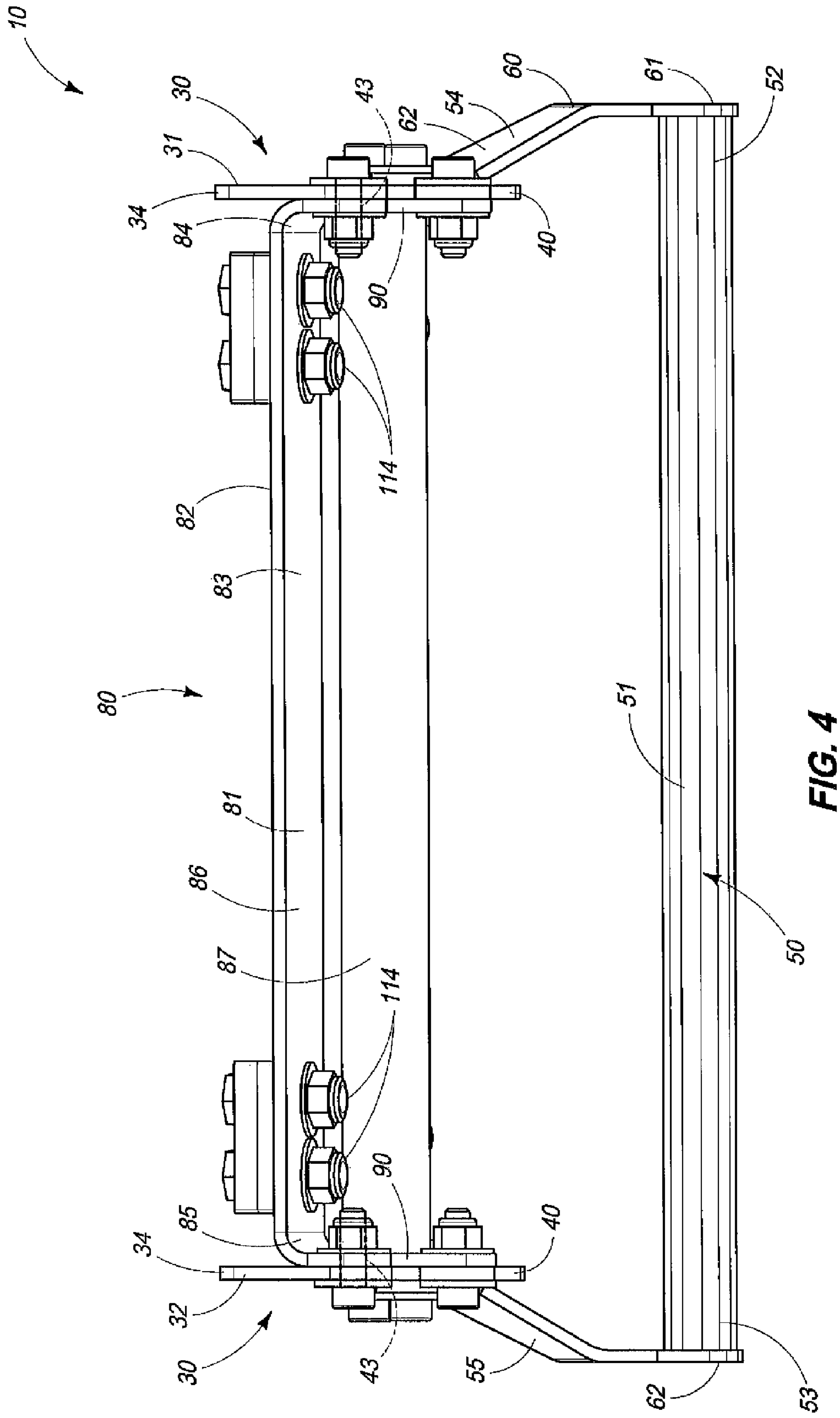
FIG. 4 is a greatly simplified, fragmentary, top plan view of the clamp of the present invention, and which is shown in a closed, clamping position.
Figure 8:
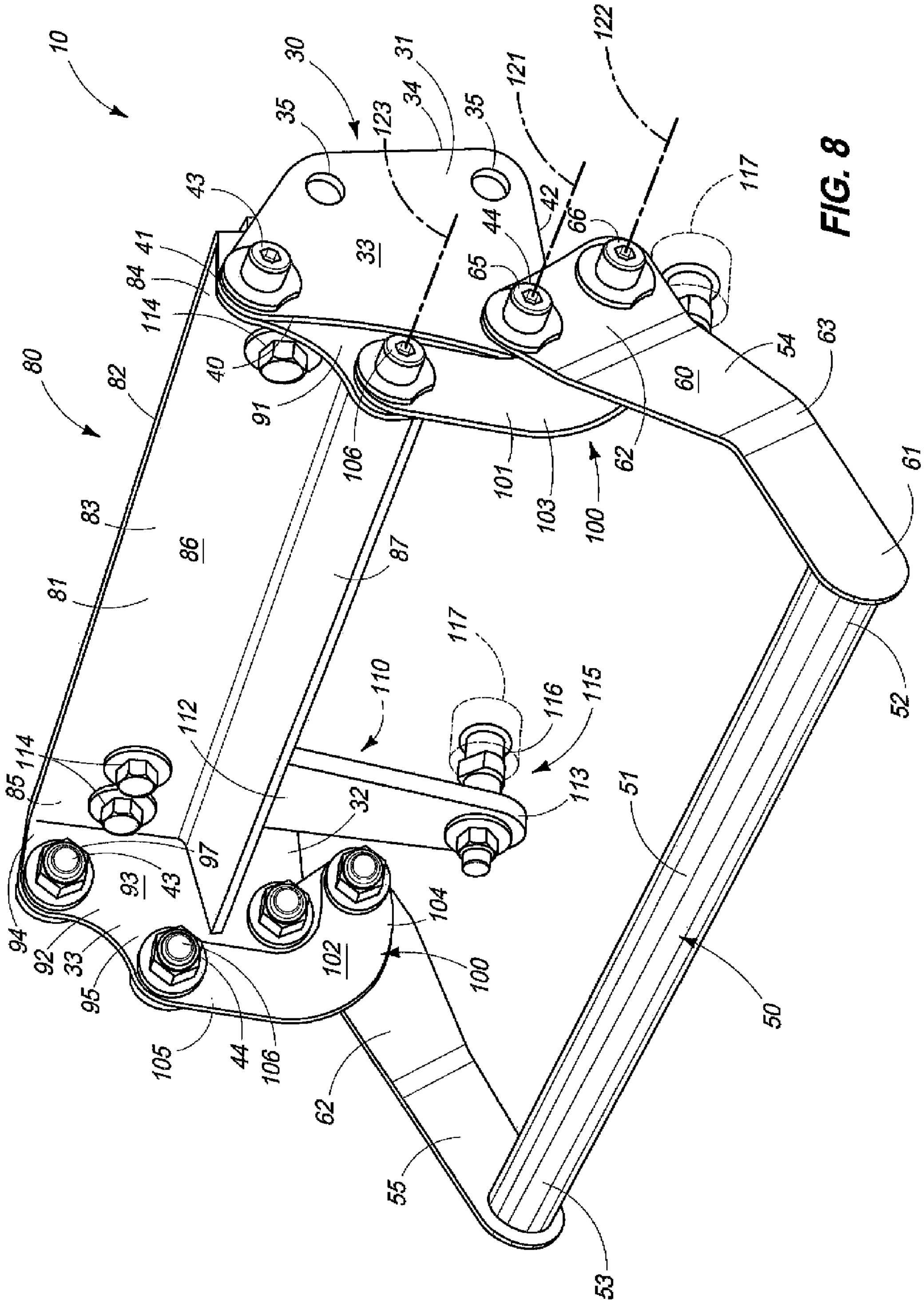
FIG. 8 is yet another perspective, side elevation view of the clamp of the present invention and which is shown in a closed, clamping position.
Figure 9:
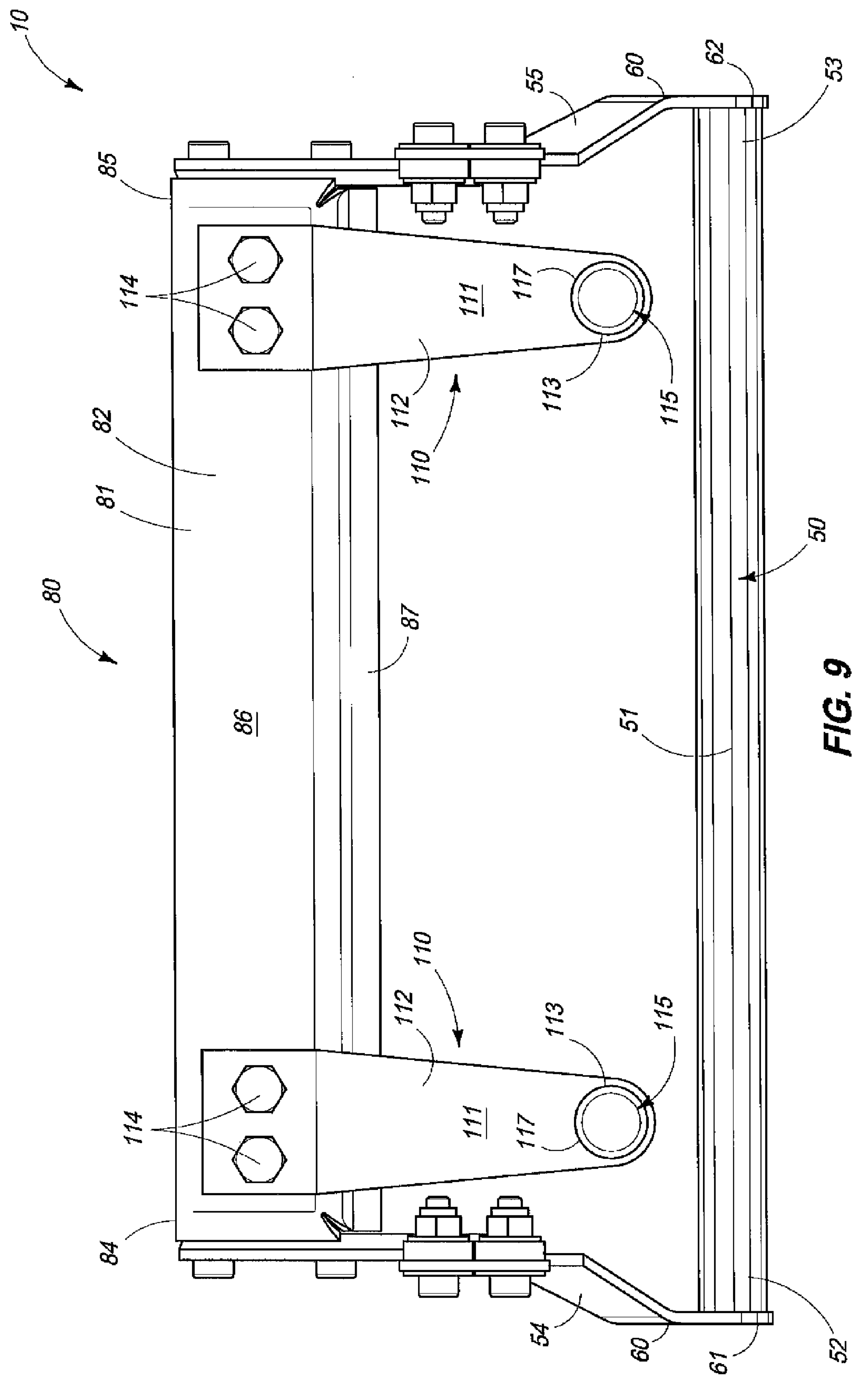
FIG. 9 is still another, side elevation view of the clamp of the present invention, and which is illustrated in a closed, clamping position.

10 so as to engage the object of interest 13, and exert force which is directed inwardly and downwardly on the object 13. By adjusting the angle of the rearwardly facing edge 34, the clamp may be oriented so as to exert a force which is directed inwardly and upwardly onto the object of interest 13. This feature of the invention will be discussed in greater detail hereinafter. As seen in FIG. 8 for example, a pair of apertures 35 are formed in close proximity to the rearwardly facing peripheral edge 34, and are each operable to receive individual fasteners 22, therethrough, so as to releasably fasten the respective first and second support members 31 and 32 to the wall 12 of the vibratory conveyor 11. As will be further seen by FIG. 8, the main body 33 has a forward or outwardly facing peripheral edge 40. The main body further has a first, or upwardly disposed end 41, and a second, or downwardly disposed end 42. As illustrated in the drawings, and more specifically to FIGS. 1 and 4, respectively, first and second apertures 43 and 44 are formed in close proximity to the first and second ends 41 and 42, respectively. These apertures further receive individual fasteners therethrough, and which will be discussed in greater detail in the paragraphs which follow.

The clamp 10 of the present invention further includes a movable handle which is generally indicated by the numeral 50. The handle 50, which has a given length dimension, is defined by an elongated main body 51 having a first end 52, and an opposite, second end 53. Still further, and extending generally perpendicularly outwardly relative to the first and second ends 52 and 53, respectively, are first and second arm members 54 and 55, respectively. The respective first and second arm members 54 and 55 each have a main body 60 which has a proximal end 61, which is affixed to the respective first and second ends 52 and 53 of the elongated main body 51, and further has a distal end 62 which has a width dimension which is significantly greater than the width dimension at the proximal end 61, and which is fastened to the opposite ends 52 and 53 of the elongated main body 51. In this regard, the main body 60 of each of the first and second arm members 54 and 55 have an angulated intermediate portion 63 which allows the distal ends 62 to be located inwardly relative to the proximal end 61. Further, and as best seen in FIG. 1, and following, a pair of apertures 64 are formed in the distal ends 62 of each of the arm members 54 and 55, respectively. The respective apertures are operable to receive a first fastener 65 which provides a pivot axis for the handle 50, and the second fastener 66 which secures the handle to one end of a force transmitting coupling which will be discussed in greater detail below. The second fastener 66 defines a second pivot axis. These respective pivot axes will be discussed later in the specification. Once assembled, and as seen in the drawings, the handle 50 is movable along a path of travel 70 between a first, open clamping position 71; and a second, closed clamping position 72. The operation of the clamp 10 of the present invention will be discussed in greater detail hereinafter.

The clamp 10 of the present invention further includes a rotatable clamping portion which is generally indicated by the numeral 80. The rotatable clamping portion is rotatably borne by the respective support members 31 and 32. The rotatable clamping portion 80 has a main body 81 which is defined, in part, by an outside facing surface 82, and an opposite, inside facing surface 83. The main body 81, as illustrated, has a substantially L-shape. Additionally, it will be seen from the drawings that the main body 81 has a first end 84, and an opposite second end 85. The main body 81 is formed of first and second members 86 and 87, respectively, and which are joined together to form a unitary main body 81 having the general L-shape.

Figure 5:
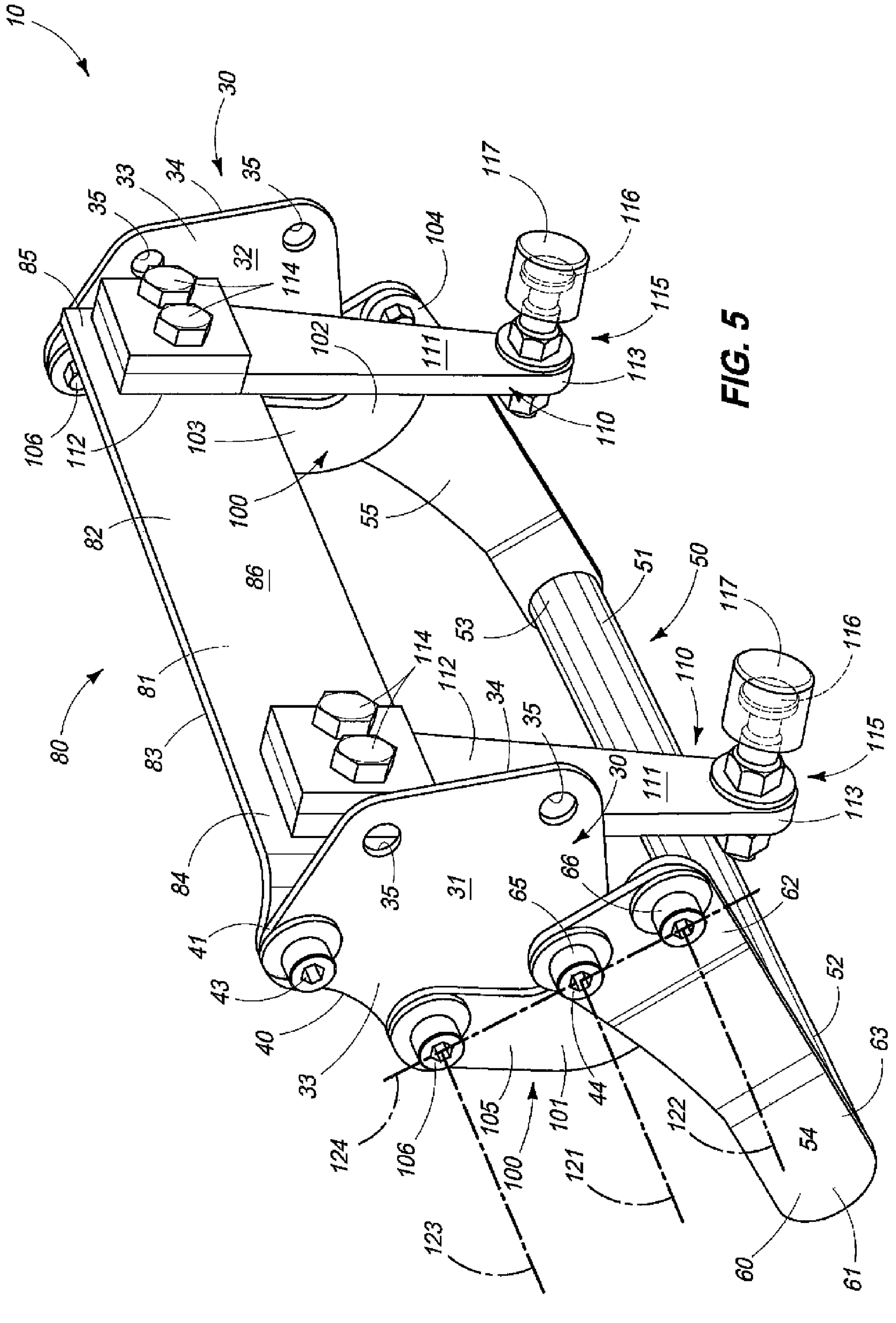
FIG. 5 is a perspective, side elevation view of the clamp of the present invention, and which is shown in a closed, clamping position.
Figure 7:
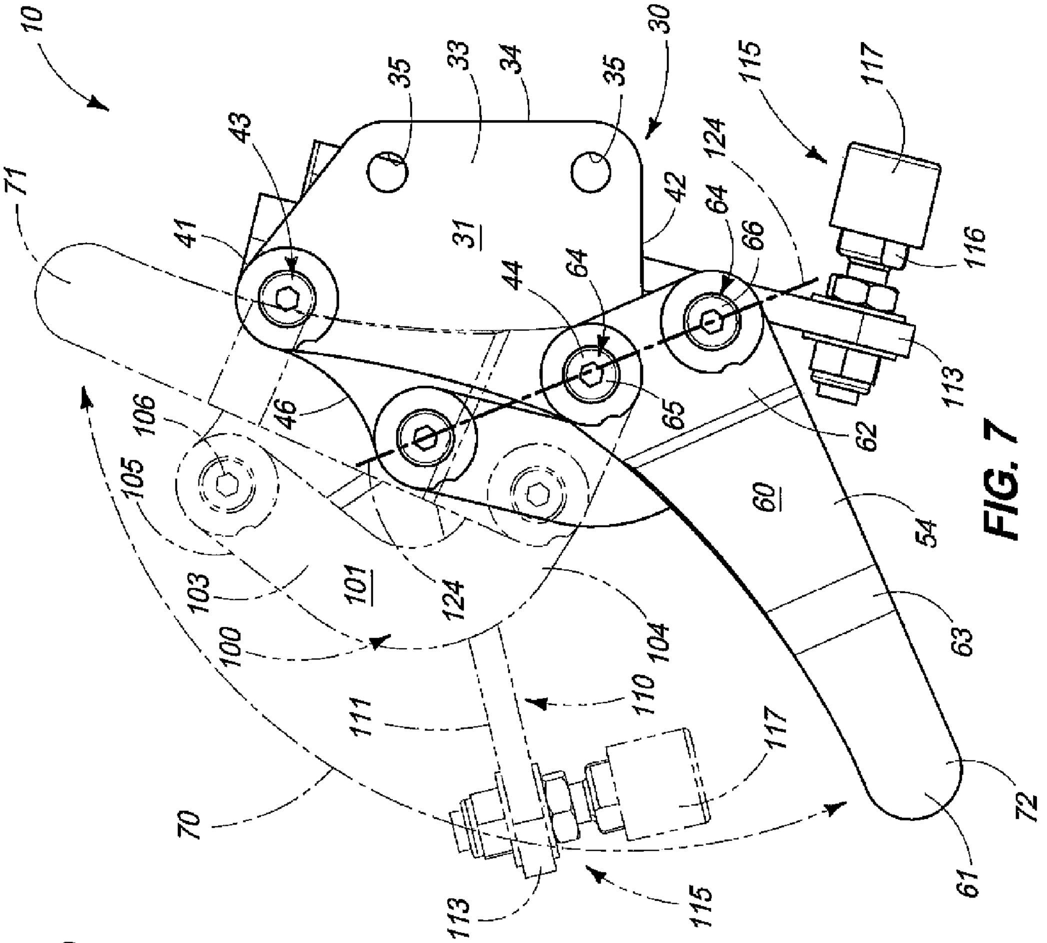
FIG. 7 is an end view of the clamp of the present invention, and showing the motion of the handle, and associated clamping portion in phantom lines.

The clamp 10 of the present invention further includes end plates 90 which are respectively secured to the opposite first and second ends 84 and 85 of the rotatable clamping portion 80. The end plates for the clamping portion 90 include a first end plate 91 which is located at the first end 84 of the main body 81, and a second end plate 92 which is located at the opposite second end 85. The end plates are of substantially identical design and shape. The end plates each have a main body 93 which has an upper, or first end 94, and a lower, or second end 95. The second, or lower end 95 extends beyond the peripheral edge of the second member 87, and which makes up a portion of the main body 81 of the rotatable clamping portion 80. This is best seen by reference to FIG. 6 where a sectional view taken through the clamping portion 80 is illustrated. As further illustrated in FIG. 6, individual apertures 96 are formed in each of the first and second ends 94 and 95 of the main body 93. Further, as illustrated in FIG. 1, and following, a fastener 97 is provided and which is inserted through the aperture 96 which is formed in the respective end plates 90. The fastener 97 is further received through the first aperture 43 which is formed in the respective support members 31 and 32, respectively. This is seen, for example, in FIG. 5. The fastener 97 allows the clamping portion 80 to partially rotate when force is applied to the handle 50 to move the handle along a predetermined course of travel 70, as earlier described.

The clamp 10 of the present invention further includes a pair of force transmitting couplings which are generally indicated by the numeral 100 in FIG. 1 and following. In this regard, the pair of force transmitting couplings include a first and a second force transmitting coupling 101 and 102, respectively, and which are mounted on the opposite ends 84 and 85 of the rotatable clamping portion 80. The respective force transmitting couplings 100 each have a main body 103 which is C or curve shaped. Each force transmitting coupling has a first end 104 which is secured by the fastener 66 at the distal end 62 of each of the respective elongated arm members 54 and 55, respectively. Additionally, the respective force transmitting couplings 100 have a second end 105 which is affixed to the second end 95 of each of the first and second end plates 91 and 92. The first and second end plates 91 and 92, again, are attached to the main body 81 of the rotatable clamping portion 80. A fastener 106 secures the second end of the respective force transmitting couplings to the second end 95 of the respective end plates 91 and 92, respectively.

The clamp 10 of the present invention further includes a pair of elongated resilient biasing members 110 which are mounted on the rotatable clamping portion 80 and more specifically the outside facing surface 82 thereof. Each of the elongated resilient biasing members has a main body 111 which has a proximal end 112, and which is further affixed on the rotatable clamping portion 80. Further, each of the resilient biasing members has a distal end 113 which extends downwardly relative to the clamping portion 80. Each of the main bodies 111 is fabricated from a resilient synthetic fiber resin material such as fiberglass or the like, and which can bend or twist about its longitudinal axis when a given amount of pressure is applied to the distal end 113 thereof. As seen in the drawings, a pair of fasteners 114 are provided and which individually engage, and secure the proximal end 112, and further pass through and are secured to the first member 86, and which forms part of the main body 81 of the rotatable clamping portion 80, Each of the elongated resilient biasing members 110 includes a threadably adjustable engagement post which is generally indicated by the numeral 115. The threadably adjustable engagement post 115 is mounted on the distal end 113, by means of a threaded post which can be adjusted to various lengths so that the threadably adjustable engagement post extends substantially perpendicularly outwardly relative to the distal end 113. Further, the distal end 116 of the threadably adjustable engagement post 115 each mounts a resilient end cap 117, and which is operable to matingly engage the wall 12 of the vibratory conveyor 11 which is located nearby. Movement of the handle 50 along the path of travel 70, and between the first and second clamping positions 71 and 72 respectively, causes each of the respective threadably adjustable engagement posts 115 to engage the object of interest 13. As the handle 50 is urged towards the second closed position 72 the main body 111 of each of the resilient biasing members deforms or deflects thereby allowing the handle 50 to be oriented such that the respective pivot axes of the handle and the first and second ends of the elongated force transmitting couplings 100 are substantially linearly aligned when the handle 50 is located in the second clamping position 72. This aspect of the invention will be discussed in the paragraphs which follow.

Figure 10:
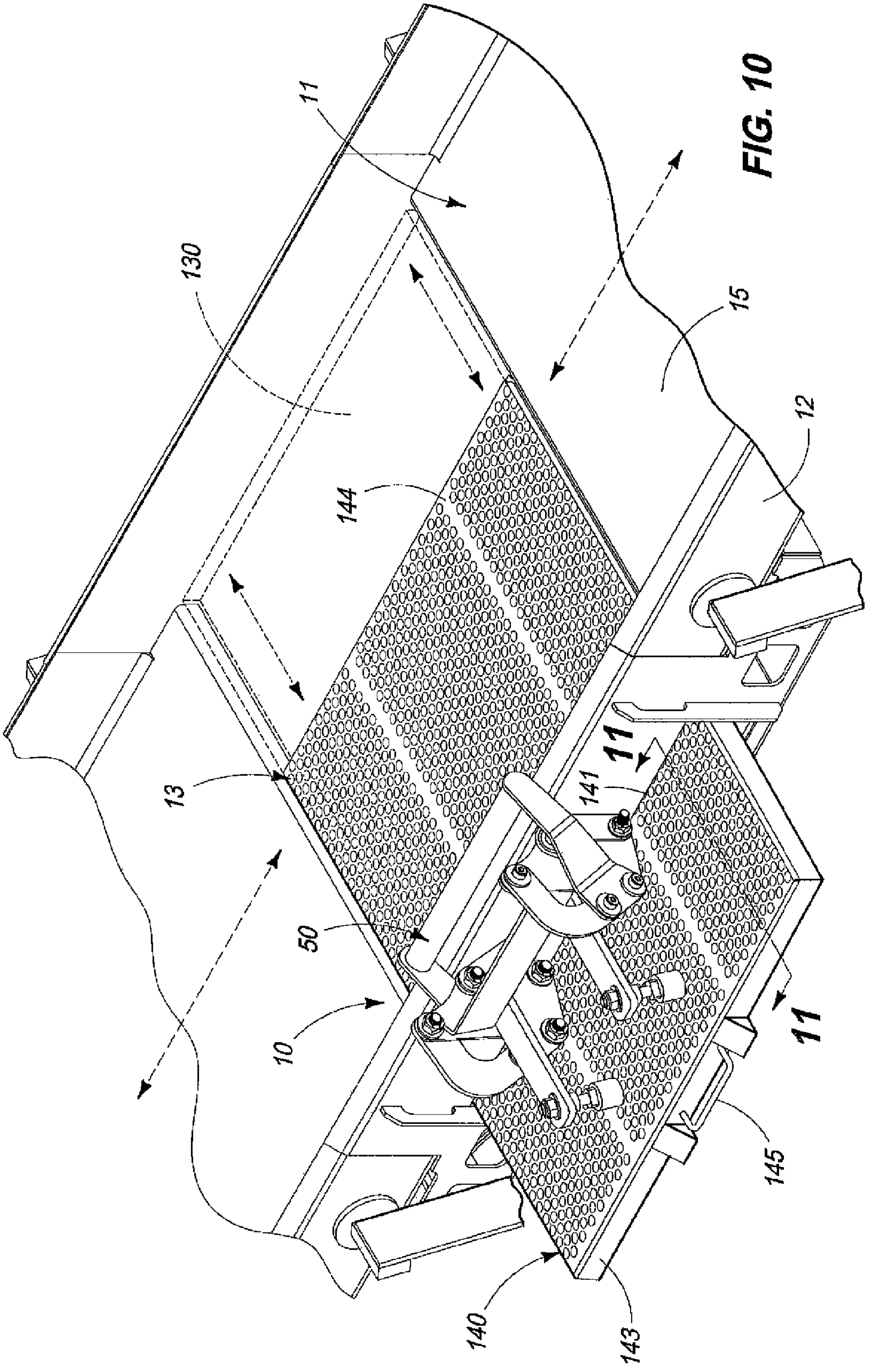
FIG. 10 is a fragmentary, greatly simplified perspective view of a vibratory conveyor employing the clamp of the present invention, and an object (here illustrated as a screen) cooperating with the vibratory conveyor, and engaged by the clamp.
Figure 11:
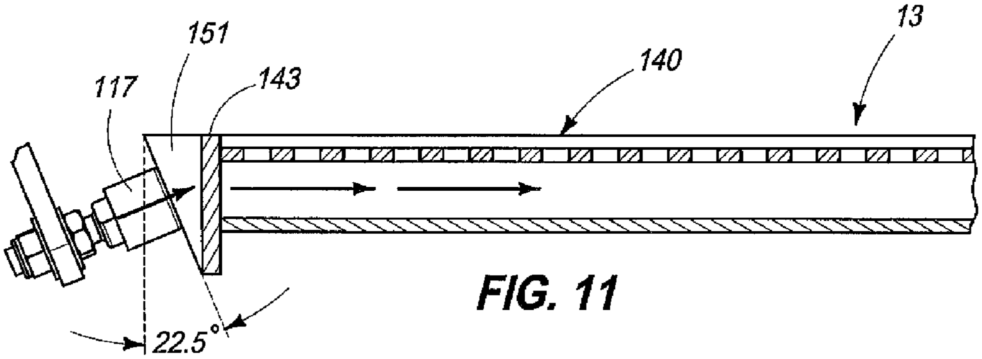
FIG. 11 is a longitudinal, vertical, sectional view taken from a position along line 11-11 of FIG. 10, and showing one form of the screen which may be utilized with the vibratory conveyor as depicted in FIG. 10.

Referring now to FIG. 10, and following, several forms of the invention are depicted. FIG. 10 shows a vibratory conveyor 11 with a product transporting bed 15. A cavity 130 is formed in the product transporting bed, and is sized so as to receive an object of interest 13, and which is herein depicted as a screen 140. Further, an aperture 141 is formed in the wall 12 of the vibratory conveyor 11, and which permits the screen 140 to be slideably received in the cavity 130. The screen has a foraminous main body 142, with opposite proximal and distal ends 143, and 144, respectively. A handle 145 is mounted on the proximal end 143, and assists in the movement of the screen 140. The proximal end 143 has an outwardly facing surface 146. As depicted in FIG. 10, the clamp is shown in a position when the screen 140 is partially withdrawn from the cavity 130. As should be understood, the clamp 10 forcibly engages the proximal end 143 of the screen 140 so as to secure the screen on the vibratory conveyor 11.

Figure 14:
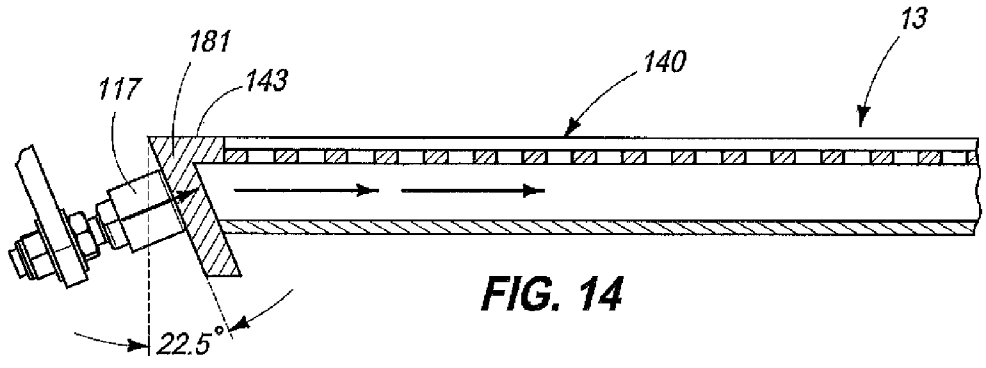
FIG. 14 is a longitudinal, vertical, sectional view taken from a position along line 11-11 of FIG. 10, and which shows a fourth form of the screen which may be utilized with the vibratory conveyor as depicted in FIG. 10.

As briefly discussed earlier in this application, the clamp 10 can be employed to exert a force on the object of interest 13 which can be either inwardly, and downwardly relative to the vibratory conveyor; or inwardly and upwardly relative thereto. To accomplish this aspect of the invention, the proximal end 143 of the screen 140 is somewhat changed or altered. As seen in the fragmentary view of FIG. 11, an inwardly and upwardly directed force can be exerted on the screen 140 by mounting an angulated surface or wedge 150 on the proximal end 143. The wedge 150 has an engagement surface 151 which has a surface angle of about 22.5 degrees when this angular measurement is measured from a horizontal plane. Another similar effect can be achieved by the form of the invention as seen in FIG. 14. In this view, a screen 140 is provided where the proximal end 143 has an outwardly facing surface 160 which has a surface angle which is oriented at an angle of about 22.5 degrees when this is measured from a horizontal plane.

Figure 12:
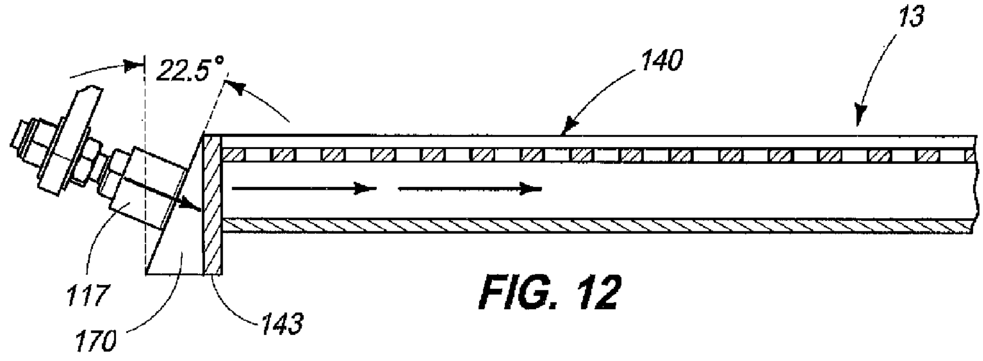
FIG. 12 is a longitudinal, vertical, sectional view taken from a position along line 11-11 of FIG. 10, and which shows a second form of the screen which may be utilized with the vibratory conveyor as depicted in FIG. 10.
Figure 13:
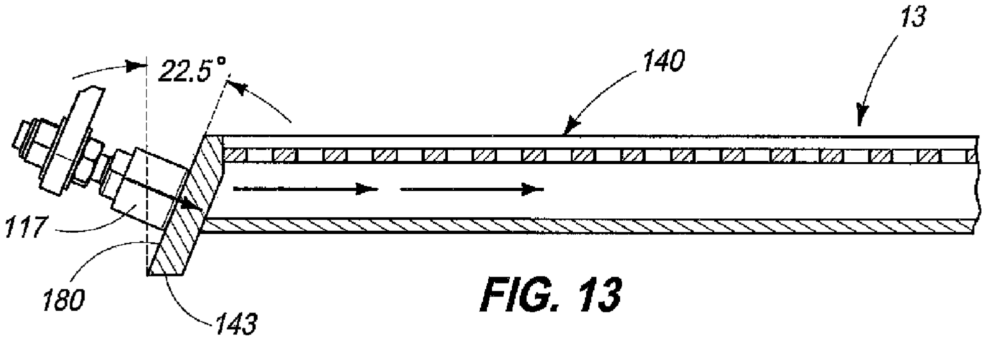
FIG. 13 is a longitudinal, vertical, sectional view taken from a position along line 11-11 of FIG. 10, and which shows a third form of the screen which may be utilized with the vibratory conveyor as depicted in FIG. 10.

Referring now to FIGS. 12 and 13, to achieve the effect where a force is exerted by the clamp 10 to move the screen 140 downwardly and inwardly relative to the vibratory conveyor 11, a wedge 170, may be provided (FIG. 12). The wedge as seen in this view has an outwardly facing surface 171 which has a surface angle which, when measured from a horizontal plane is about 22.5 degrees. As seen in FIG. 13, a screen 140 can be provided and wherein the proximal end 143 thereof has an outwardly facing surface 180 which has a surface angle which is about 22.5 degrees when measured from a horizontal plane. As should be understood, the clamp 10, and more specifically the support brackets 20 would be modified to provide a wedge having an inclination of 22.5 degrees and which would be placed between the rearward peripheral edge 34 and the wall 11 so as to achieve the proper angular orientation of the clamp 10, and exert a clamping force which urges the screen 140 inwardly and upwardly relative to the vibratory conveyor 11. Of course, alternatively shaped support brackets can be easily fabricated to provide the additional 22.5 degrees of angular inclination which is necessary to achieve this same effect.

OPERATION

The operation of the described embodiment of the present invention is believed to be readily apparent, and is briefly summarized at this point.

Figure 6:
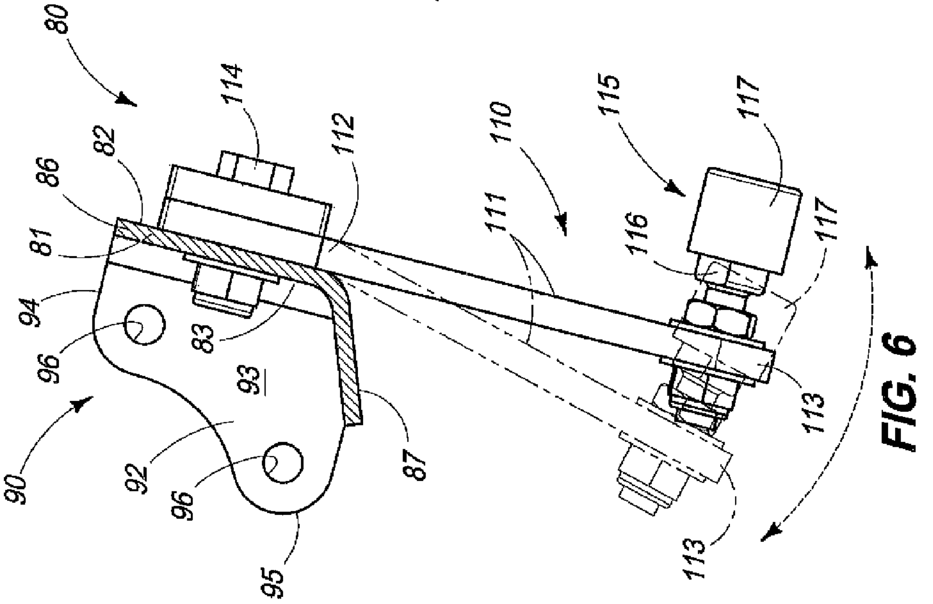
FIG. 6 is a partial, transverse, vertical sectional view taken from a position along line 6-6 of FIG. 3.

In its broadest aspect, the present invention relates to a clamp 10 which includes a base portion 30 having individual support members 31 and 32, respectively, and which are located in predetermined, spaced, substantially parallel relation, one relative to the other. Still further, the clamp 10 includes a handle 50 which has opposite ends 52 and 53, respectfully, and which are individually, pivotally affixed to each of the support members 31 and 32, by individual arms 54 and 55. Still further, the clamp 10 includes a moveable clamp portion 80 having opposite ends 84 and 85, respectively, and which are individually pivotally attached to the respective support members 31 and 32, respectively. The clamp 10 additionally includes a pair of force transmitting couplings 100, each having a first end 104, and which is pivotally attached to the handle 50; and an opposite, second end 105 which is pivotally attached to the moveable clamp portion 80. Moreover, the clamp 10 of the present invention includes an elongated resilient biasing member 110 having a proximal and a distal end 112 and 113, respectively, and which is borne by the moveable clamp portion 80. The distal end 113 of the elongated resilient biasing member 110 resiliently deforms when the elongated resilient biasing member 110 forcibly engages an adjacent object such as the vibratory conveyor 11, or the object of interest 13, as force is applied to move the handle 50 along a given course of travel which is generally indicated by the numeral 70. The clamp 10 further includes a threadably adjustable engagement post 115 which is mounted on the distal end 113 of each of the elongated resilient biasing members 110. Each threadably adjustable engagement post 115 has a distal end 116 which engages the adjacent vibratory conveyor object 13. The threadably adjustable engagement post 115 extends perpendicularly, outwardly, relative to the respective distal ends 116 of each of the elongated resilient biasing members. The resilient deformation of the respective elongated resilient biasing members is best seen in FIG. 6, and where the subsequent deformation is shown in phantom lines. In the arrangement as seen in the drawings, the clamp 10, as described, includes a handle 50 which pivots about a given pivot axis 121, and the first and second ends 104 and 105 of the respective elongated force transmitting couplings 100 each pivot about a given axis 122 and 123, respectively, when the handle 50 moves from the first, non-clamping orientation 71, to a second, clamping position 72. In the arrangement as seen in the drawings, the respective pivot axes of the handle 50, and the first and second end 104, and 105, of elongated force transmitting couplings 100 are substantially linearly aligned 124 when the handle 50 is located in the second, clamping position 72.

More specifically, the clamp 10 of the present invention includes a base portion 30 which is affixed to a wall 12 of a vibratory conveyor 11. In the arrangement as seen in the drawings, the object 13 further cooperates with a vibratory conveyor 11 having a product transporting bed 15 upon which a source of a product (not shown) is transported. The base portion 30 has individual support members 31 and 32, respectively, and which are individually affixed to the wall 12 of the vibratory conveyor 11, and which further extends perpendicularly, outwardly therefrom. The individual support members 31 and 32 are further located a given distance apart. The clamp 10 of the present invention also includes a handle 50 having opposite ends 51 and 52, respectively, and which further has a given length dimension which is greater than the length dimension as measured between the respective support members 31 and 32, and which is shown in a presently conceived form of the invention. The handle 50 further has individual arm members 54 and 55, and which are further mounted on the opposite ends 52 and 53 of the of the handle 50, and which further each have a distal end 62 which is pivotally mounted to one of the support members 31 and 32 of the base portion 30. The handle 50 of the present invention is moveable along an arcuately shaped path of travel 70 between a first and a second position 71 and 72, respectively. The clamp 10 of the present invention also includes a rotatable clamping portion 80 which is borne by the respective support members 31 and 32, respectively. The rotatable clamping portion 80 has a main body 81, with opposite ends 84 and 85. Each end of the rotatable clamping portion 80 is rotatably mounted on each of the respective support members 31 and 32. As should be understood, forcible movement of the handle 50; along the path of travel 70, has the effect of causing the selective rotation of the rotatable clamping portion 80. The clamp 10 includes a pair of force transmitting couplings each having a first end 104, and which are individually, rotatably affixed on the handle 50, and an opposite second end 105, which is rotatably mounted on the rotatable clamping portion 80. Additionally, the clamp 10 includes a pair of elongated resilient biasing members 110 which are individually mounted on the opposite ends of the rotatable clamping portion 80. Each of the elongated resilient biasing members 110 has a main body which has a similar length dimension. A threadably adjustable engagement post 115 is mounted on each of the of the elongated resilient biasing members, and which further causes the elongated resilient biasing members 110 to deform when the respective elongated resilient biasing members 110 forcibly engage the adjacent vibratory conveyor 11. As should be understood, when located in the second clamping position 72, the handle 50 securely positions the object 13 in a given fixed, releasable orientation relative to the vibratory conveyor 11, but further allows for the releasable decoupling of the object in a highly efficient manner, and without the use of any tools.

Therefore, it will be seen that the present invention provides a means for securing various objects of interest on a vibratory conveyor in a manner not possible heretofore. The present clamp is reliable, easy to operate, provides a significant amount of clamping force, and further allows objects of interest to be readily removed, replaced, cleaned and otherwise repaired and then placed back into service on a vibratory conveyor at a speed, and reliability not possible, heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalents.

We claim:

1. A clamp, comprising:

a base portion having individual support members which are located in predetermined, spaced, substantially parallel relation, one relative to the other;

a handle which has opposite ends, and which are individually, pivotally affixed to each of the support members;

a moveable clamp portion having opposite ends, and which are individually pivotally attached to the respective support members;

a pair of force transmitting couplings each having a first end which is pivotally attached to the handle, and an opposite, second end which is pivotally attached to the moveable clamp portion; and an elongated resilient biasing member having a proximal and a distal end, and which is borne by the moveable clamp portion, and wherein the distal end of the elongated resilient biasing member resiliently deforms when the elongated, resilient biasing member forcibly engages an adjacent object as a force is applied to move the handle along a course of travel.

2. A clamp as claimed in claim 1, and wherein the base portion is affixed to a wall which defines, at least in part, a vibratory conveyor bed, and wherein the adjacent object cooperates with the vibratory conveyor bed, and is releasably secured in a given orientation relative to the conveyor bed by the clamp.

3. A clamp as claimed in claim 1, and wherein the base portion is affixed to a wall of an object of interest, and wherein the object of interest cooperates with the vibratory conveyor.

4. A clamp as claimed in claim 1, and wherein the elongated resilient biasing member comprises a pair of elongated resilient biasing members which are individually mounted on the opposite ends of the moveable clamp portion, and which further extend substantially normally downwardly relative thereto.

5. A clamp as claimed in claim 4, and further comprising:

a threadably adjustable engagement post which is mounted on the distal end of each of the elongated resilient biasing members, and wherein each threadably adjustable engagement post has a distal end which engages the adjacent object of interest, and wherein the threadably adjustable engagement post extends substantially perpendicularly outwardly relative to the respective distal ends of each of the elongated resilient biasing members.

6. A clamp as claimed in claim 5, and wherein the handle pivots about a given pivot axis, and the first and second ends of the elongated force transmitting couplings each pivot about a given pivot axis when the handle moves from a first, non-clamping orientation, to a second, clamping position, and wherein the respective pivot axes of the handle, and the first and second ends of elongated force transmitting couplings are substantially linearly aligned when the handle is located in the second, clamping position.

7. A clamp as claimed in claim 6, and wherein the handle has a length dimension which is greater than a distance as measured between the individual support members.

8. A clamp as claimed in claim 6, and wherein the respective force transmitting couplings each have a curved shape.

9. A clamp as claimed in claim 8, and wherein the respective elongated resilient biasing members each have a length dimension which is less than 4 inches.

10. A clamp as claimed in claim 8, and wherein the respective elongated resilient biasing members are fabricated from a synthetic fiber-based material.

11. A clamp as claimed in claim 10, and wherein the adjacent object is a screen having a proximal and a distal end, and wherein the respective threadably adjustable engagement posts forcibly engage the proximal end of the screen to urge the screen into a secure mating engagement with the vibratory conveyor.

12. A clamp as claimed in claim 11, and wherein the threadably adjustable engagement posts apply a force which urges the screen inwardly and downwardly relative to the vibratory conveyor.

13. A clamp as claimed in claim 11, and wherein the threadably adjustable engagement posts apply a force which urges the screen inwardly, and upwardly relative to the vibratory conveyor.

14. A clamp as claimed in claim 11, and wherein the proximal end of the screen has an outwardly facing surface which includes a region which has a surface angle of about 22.5 degrees when measured from a horizontal plane.

15. A clamp as claimed in claim 12, and wherein the rotatable clamping member has a main body which is formed of first and second members which are joined together to form an L-shape, and wherein each of the resilient biasing members are mounted on the first member, and extend downwardly therefrom, and wherein individual end plates are mounted on the opposite ends of the rotatable clamping portion, and are affixed to each of the first and second members which form the rotatable clamping member, and wherein each of the individual end plates have a first end which is pivotally affixed to the individual support members, and a second end, and wherein the second end of each of the force transmitting couplings are rotatably affixed to the second end of the respective first and second end plates.

16. A clamp, as claimed in claim 4, and wherein the respective threadably adjustable engagement posts, each have a distal end which is formed of a synthetic, resilient material.

17. A clamp, comprising:

a base portion which is affixed to a wall of a vibratory conveyor having a product transporting bed and upon which a source of a product is transported, and wherein the base portion has individual support members which are affixed to the wall of the vibratory conveyor, and which further extend perpendicularly, outwardly therefrom, and wherein the individual support members are located a given distance apart;

a handle having opposite ends, and a given length dimension which is greater than the length dimension as measured between the respective support members, and wherein the handle further has individual arm members which are mounted on opposite ends of the handle, and which further each have a distal end which is pivotally mounted to one of the support members of the base portion, and which further renders the handle moveable along an arcuately shaped path of travel between a first clamping position and a second clamping position;

a rotatable clamping portion which is borne by the respective support members, and wherein the rotatable clamping portion has a main body with opposite ends, and wherein each end of the rotatable clamping portion is rotatably mounted on each of the respective support members, and wherein a forcible movement of the handle along the path of travel has the effect of causing selective rotation of the rotatable clamping portion;

a pair of force transmitting couplings each having a first end which are individually, rotatably affixed on the handle, and an opposite second end, which is rotatably mounted on the rotatable clamping portion; and a pair of elongated resilient biasing members which are individually mounted on the opposite ends of the rotatable clamping portion, and wherein each of the elongated resilient biasing members has a main body which has a similar length dimension, and wherein a threadably adjustable engagement post is mounted on each of the elongated resilient biasing members, and which further causes the elongated resilient biasing members to deform when the respective elongated resilient biasing members forcibly engage an object which cooperates with the vibratory conveyor, and wherein the handle when located in the second, clamping position securely positions the object in a given orientation on the vibratory conveyor.

18. A clamp as claimed in claim 17, and wherein the handle pivots about a given pivot axis, and the first and second ends of the elongated force transmitting couplings each pivot about a given pivot axis when the handle moves from the first, non-clamping orientation, to a second, clamping position, and wherein the respective pivot axes of the handle, and the first and second ends of elongated force transmitting couplings are substantially linearly aligned when the handle is located in the second, clamping position.

19. A clamp as claimed in claim 18, and wherein the object has a proximal, and a distal end, and which further matingly, and moveably cooperates with the vibratory conveyor, and wherein the respective threadably adjustable engagement posts forcibly urge the object inwardly relative to the vibratory conveyor.

20. A clamp as claimed in claim 19, and wherein the threadably adjustable posts further urge the object downwardly relative to the vibratory conveyor.

21. A clamp as claimed in claim 19, and wherein the threadably adjustable engagement posts further urge the object upwardly relative to the vibratory conveyor.

22. A clamp as claimed in claim 19, and wherein the wall of the vibratory conveyor is substantially vertically oriented and wherein the proximal end of the object has an outwardly facing surface which defines a region having a surface angle of about 22.5 degrees when measured from a horizontal plane, and wherein the respective threadably adjustable engagement posts forcibly cooperate with the outwardly facing surface.

23. A clamp as claimed in claim 18, and wherein the object has a variable length dimension, and wherein the respective elongated resilient biasing members, and associated threadably adjustable engagement posts, can effectively, forcibly engage the vibratory conveyor so as to effectively, releasably, secure the object in a predetermined, operational orientation relative to the vibratory conveyor.

* * * * *